(No Model.)

J. KLINGEL.
CONDENSER.

No. 322,615. Patented July 21, 1885.

Witnesses:
T. H. Wells
A. Keithley

Inventor
Joseph Klingel,
per A. B. Upham,
His Attorney.

UNITED STATES PATENT OFFICE.

JOSEPH KLINGEL, OF PEORIA, ILLINOIS.

CONDENSER.

SPECIFICATION forming part of Letters Patent No. 322,615, dated July 21, 1885.

Application filed February 28, 1885. (No model.)

*To all whom it may concern:*

Be it known that I, JOSEPH KLINGEL, of Peoria, in the county of Peoria, in the State of Illinois, have invented an Improved Condenser; and I do hereby declare that the following is a full, clear, and exact description thereof, reference being had to the annexed drawings, making a part of this specification, in which like letters of reference refer to like parts, and in which—

Figure 1:
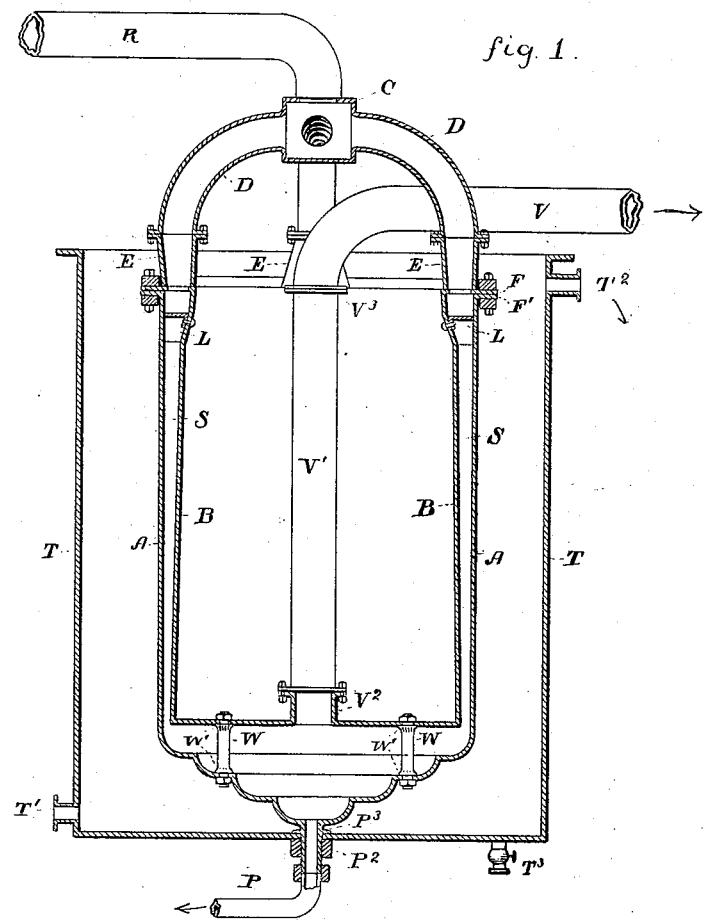
Figure 2:
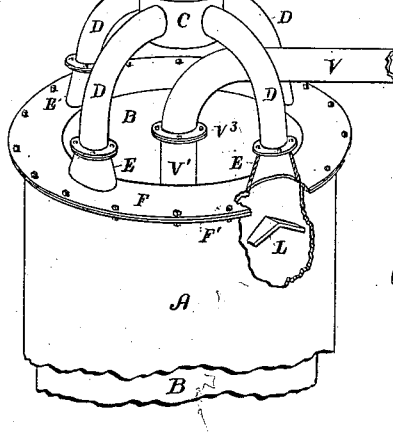

Figure 1 represents a central vertical section of the condenser; Fig. 2, a perspective view of the upper portion of the same.

This invention is in the line of apparatus for cooling and separating alcoholic vapor from the watery vapor and low wine contained therein, and the especial form of apparatus upon which my improvements are based is that in which an annular spirit-vapor space is suitably surrounded by cold water and provided with vapor-inlet, uncondensed-vapor outlet, and low-wine outlet.

In the drawings, T is the tank for containing the water of the proper temperature for condensing steam, but not alcoholic vapor. T' are the water-supply pipes, and T² the overflow. T³ is the drain-valve. Supported in said tank is a cylindrical vessel, preferably of copper, having its bottom formed with a central downward slope. Such slope is best attained by making the bottom either conical, spherical, or of a general conical form, but more or less corrugated, as shown in the drawings. From the center of the concave bottom of said vessel A extends the low-wine-outlet pipe P, which is provided with the head P³, threads and nut P², to enable the same to be firmly and tightly secured to the bottom of the tank T. The portion P of this pipe is made capable of disconnection from the remainder of the pipe to enable it to be drawn up from the opening in which it is usually held by the nut P². Within said vessel A is a somewhat smaller one, B, made of a larger diameter at its base than at its top. This makes an annular space between the external face of the vessel B and the inner face of the outer vessel, A, of an acute wedge shape, as in Fig. 1. The first few inches of the upper part of this space is still further enlarged by a more sudden contraction of the upper edge of the vessel B, a flange, F, being formed at this edge of said vessel B of a sufficient width to extend beyond the edge of the vessel A, and an external flange formed on said latter vessel. Suitable binding-rings and bolts enable said flanges to be tightly secured together and said annular space to be entirely inclosed. Two or more short pipes, W, held in place by nuts screwed onto the ends thereof, hold fast together the bottoms of the two vessels, and also permit the water in the tank T to pass readily into the inner vessel, B. Said stay-pipes W are provided with shoulders W' by which to make the screw-joints perfectly water-tight, and also to help support the inner vessel.

It is in the annular space S, between the sides of the two vessels A and B, that the required condensation and separation of the watery vapor from the alcoholic vapor is to be done, and to get the said vapor into this space I have devised the following means: At a suitable distance above the centers of the vessels A B is a drum, C, into which the pipe R brings the alcoholic vapor from the still or spirit-column usually used in the distillation of alcohol or spirit. From the said drum C extend two or more short branch pipes, D, which open at their lower ends into the upper part of the space S. To join said branch pipes with said space I introduce a short stub, E, between the lower end of each branch pipe and the flange top. The upper ends of these stubs are circular and provided with flanges, to which are joined the flanged ends of the pipes D, while their lower ends are made elliptical and united tightly to the flange top. This terminal radial elongation of the lower ends of said stubs is in the same direction with the circumference of the space S, and the purpose of the same is that the vapor as it issues therefrom may be given a lateral flow in said space. This also enables said branch pipes to be greater in diameter than the width of the flange top and still transmit the same volume of vapor therethrough into the space S, as well as thereby insuring the more even flow and distribution of the vapors. To still further increase this lateral spreading of the inflowing vapor, I introduce the deflectors L into the space A a short distance below each stub E. These deflectors L are made of an obtuse inverted-V shape, and are held in place by suitable bolts or by being soldered to the inner vessel, B.

The alcoholic vapor, after entering the space S through the branch pipes D, passes downward through the narrowing annular cooling-chamber to the portion thereof between the bottoms of the vessels A B. From here the condensed watery vapor descends through the pipe P back to the still, column, or where else desired, while the purified alcoholic vapor passes on up through the pipe V to the cooler. To join this pipe V to the bottom of the vessel B, I form the flanged stub $V^2$ at the center of the said bottom, to which the flanged lower end of said pipe can be secured. Not only is this part V' of the pipe V adapted to be readily fastened to and disconnected from the stub $V^2$, but by means of flanged connections $V^3$ it can be separated from the elbow and remainder of said pipe.

The advantages which I derive from my construction are, among others, that while the vapor can pass readily from the pipe R to the condensing-chamber S, there is still ample room between the branch pipes D to give access to the interior of the vessel B for the purpose of repairs and cleansing. Access is also readily obtained to the condensing-chamber S between the two vessels A B. By unbolting the flanges F F', unfastening the pipe-stays W, and disconnecting the branch pipes D from the stubs E, and also removing the pipe-section V', the inner vessel, B, can be raised entirely out from the vessel A, and the interior of the latter and exterior of the former can be cleansed or repaired as required. Instead of making the said deflectors invertedly V-shaped, I often have them perfectly flat and held horizontally.

In place of the cylindrical drum C, I often make a horseshoe-shaped drum and have the branch pipes D run straight up vertically thereto; or the drum may be a long horizontal cylinder, and there may be two vertical branch pipes, D, running up to it.

I am aware that condensers of a similar form to mine have been previously in use, so that I do not claim the same, broadly; but What I do claim as my invention, and for which I desire Letters Patent, is as follows, to wit:

In a condenser, the vessel A, having low-wine outlet P and flange F', the interposed vessel B, having contracted upper diameter and outwardly-projecting flange F, means for securing together said flanges, the stay-pipes W, in combination with the outlet vapor-pipe V, terminally-distorted branch pipes D, opening into the space between said vessels, and the drum C, joining said branch pipes to the vapor-supply, substantially as and for the purpose set forth.

In testimony that I claim the foregoing invention I have hereunto set my hand this 18th day of February, 1885.

JOSEPH KLINGEL.

Witnesses:
  A. B. UPHAM,
  A. KEITHLEY.